3,373,198
SUBSTITUTED 5a,11a-DEHYDRO-6-EPITETRACYCLINES

Michael Joseph Martell, Jr., Pearl River, and Adma Schneller Ross, Suffern, N.Y., assignors to American Cyanamid Company, Stamford, Conn., a corportion of Maine
No Drawing. Filed Apr. 27, 1967, Ser. No. 634,141
10 Claims. (Cl. 260—559)

ABSTRACT OF THE DISCLOSURE

This disclosure describes compounds of the class of 5a,11a-dehydro-6-epitetracyclines, useful as anti-bacterial agents.

Brief summary of the invention

This invention relates to new members of the tetracycline family and, more particularly, is concerned with novel compounds which may be represented by the following general formula:

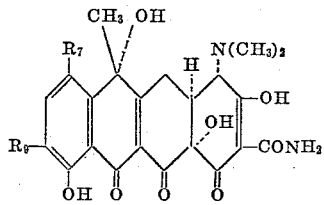

wherein $R_7$ is hydrogen, chloro, bromo, nitro, amino, mono(lower alkyl)amino or di(lower alkyl)amino and $R_9$ is hydrogen, nitro, amino, mono(lower alkyl)amino or di(lower alkyl)amino. Suitable lower alkyl groups are those having up to about 6 carbon atoms such as, for example, methyl, ethyl, isopropyl, n-butyl, isobutyl, tert.-amyl, and the like.

Detailed description of the invention

The novel 5a,11a-dehydro-6-epitetracyclines of the present invention are, in general, yellow crystalline solids having characteristic melting points and absorption spectra. They are relatively insoluble in water, diethyl ether, cyclohexane and petroleum ether but are relatively soluble in methanol, ethanol, ethyl acetate, dimethylformamide, and the like. The infrared and ultraviolet absorption spectra are characteristic of the novel compounds of the present invention and provide a preferred means of distinguishing and identifying them.

The novel compounds of the present invention are capable of forming salts with a variety of organic and inorganic acids. Such salts may be readily prepared by the simple addition of acid to the tetracycline compound in an inert organic solvent such as methanol or ethanol. These salts include those prepared from acids such as hydrochloric, hydrobromic, hydriodic, sulfuric, phosphoric, sulfamic, tartaric, glycolic, citric, maleic, succinic, acetic, ascorbic, and the like. Furthermore, since the novel compounds of the present invention are amphoteric, they also form salts with a variety of organic and inorganic bases. Exemplary of these salts are alkali metal salts such as sodium and potassium salts, the ammonium salts, alkaline earth metal salts such as the calcium and magnesium salts, as well as salts with primary amines such as ethylenediamine. Such salts, of course, are prepared by conventional procedures recognized by those skilled in the art. For purposes of this invention, the free bases are equivalent to their cationic and anionic salts.

The novel compounds of the present invention are useful as antibacterial agents and possess broad-spectrum antibacterial activity in vitro against a variety of standard laboratory microorganisms used to screen for activity against pathogens. The antibacterial spectrum of typical compounds of the present invention, representing the concentration required to inhibit the growth of various typical bacteria, was determined in a standard manner by the agar-dilution streak-plate technique which is commonly used in testing new antibiotics. The minimal inhibitory concentrations expressed in micrograms per milliliter of test compound against various test organisms are set forth in Table I below. For comparison purposes, the antibacterial spectrum of tetracycline and 7-chloro-5a,11a-dehydrotetracycline is also included.

TABLE I (1) 7-chloro-5a,11a-dehydro-6-epitetracycline
(2) 5a,11a-dehydro-6-eEitetracycline
(3) 7-chloro-5a,11a-dehydrotetracycline
(4) Tetracycline

| Organism | (1) | (2) | (3) | (4) |
|---|---|---|---|---|
| Mycobacterium smegmatis ATCC 607 | 6.2 | 31 | >250 | 6.2 |
| Staphylococcus aureus ATCC 6538P | 12.5 | 62 | >250 | 6.2 |
| Staphylococcus aureus, strain Smith | 12.5 | 62 | >250 | 6.2 |
| Sarcina lutea ATCC 9341 | 12.5 | | >250 | 12.5 |
| Bacillus cereus ATCC 10702 | 0.62 | | 250 | 1.25 |
| Staphylococcus aureus NY 104 | 31 | | | 12.5 |
| Streptococcus faecalis ATCC 8043 | 31 | 62 | >250 | 12.5 |
| Streptococcus pyrogenes C-203 | 6.2 | 31 | >250 | 3.1 |
| Bacillus subtilis ATCC 6633 | 3.1 | | >250 | 3.1 |
| Proteus vulgaris ATCC 9484 | 31 | 125 | >250 | 31 |
| Escherichia coli ATCC 9637 | 125 | | >250 | 62 |
| Klebsiella pneumoniae ATCC 10031 | 6.2 | | >250 | 12.5 |
| Salmonella typhosa ATCC 6539 | | 125 | | 8 |
| Escherichia coli U 311 | | >250 | | 31 |
| Escherichia coli DY | | >250 | | 250 |
| Klebsiella pneumoniae 53 "A" ST. AD | | >250 | | 8 |
| Enterobacter aerogenes 75 | | >250 | | 62 |
| Pseudomonas aeruginosa ATCC 10145 | | >250 | >250 | 62 |

The high in vitro antibacterial activity of the novel compounds of the present invention makes them useful as additives to materials which are subject to microbial deterioration such as cutting oils and fuel oils. They are also useful in soaps, shampoos and topical compositions for the treatment of wounds and burns.

The novel 5a,11a-dehydro-6-epitetracyclines of the present invention are also effective in vivo against certain standardized infections in mice such as Staphylococcus aureus, strain Smith (ATCC 13709). Staphylococcus aureus, strain Smith, has been studied at the Rockefeller Institute and has been described by J. M. Smith and R. J. Dubos in Journ. Expt. Med., 103, 87 (1956). Staphylococcus aureus, strain Smith, is coagulase positive, tellurite negative, and is sensitive to tetracycline, penicillin, streptomycin, erythromycin, carbomycin, neomycin, chloroamphenicol and novobiocin in vitro. Attempts have been made for phage typing of this strain, but it has been determined that it is non-typable.

Measurements of the in vivo activity of the novel compounds of the present invention were made according to the following procedure. Unit test and control groups consisted of 5 Carworth Farms (CF 1) mice, females, and initial weights of the mice averaged 18–21 grams per mouse. Infections were produced by intraperitoneal injections of 0.5 milliliter volumes of a $10^{-2}$ trypticase soy broth (TSB) dilution of a 5-hour blood broth culture of Staphylococcus aureus, strain Smith (ATCC 13709), containing units as determined by plate counts. The compound being tested was administered to the test mice in graded doses. The test compound was administered either as a single subcutaneous injection (S), a single intravenous injection (I) or as a single oral tubing dose (O) of 0.2 ml. of a 0.1 N HCl dilution containing the dosage amount, one half hour after infection. The mice were held for 7 days and survivals and deaths recorded; untreated control mice died of this infection within 24 hours.

Table II below indicates the number of surviving mice over the total treated at different dose levels of typical compounds of the present invention. To provided comparison, comparable values are given for tetracycline hydrochloride and 7-chloro-5a,11a-dehydrotetracycline.

TABLE II (1) 7-chloro-5a,11a-dehydro-6-epitetracycline
(2) 5a,11a-dehydro-6-epitetracycline
(3) 7-chloro-5a,11a-dehydrotetracycline
(4) Tetracycline hydrochloride

| Dosage in mg./kg. of body weight: | (1) | | (2) | | (3) | (4) | | |
|---|---|---|---|---|---|---|---|---|
| | (I) | (O) | (O) | (S) | (O) | (I) | (O) | (S) |
| 256 | | | | | 0/5 | | | |
| 128 | 9/10 | 5/5 | | | | | | |
| 64 | 8/10 | | | 0/10 | 0/10 | | 10/10 | 10/10 |
| 32 | 4/10 | | 3/5 | | | | 7/10 | |
| 16 | 10/10 | 2/10 | | 0/10 | 0/10 | | 5/10 | |
| 8 | 8/10 | 0/10 | 1/5 | | | | 1/10 | 4/10 |
| 4 | 0/10 | | | | | 10/10 | 1/10 | |
| 2 | 3/10 | | 1/5 | | | 6/10 | | |
| 1 | 0/10 | | | | | 2/10 | | |
| 0.5 | | | | | | 1/10 | | |
| 0.25 | | | | | | 0/10 | | |

The novel derivatives of the present invention may be incorporated with various suitable pharmaceutical carriers in dosage forms which are of value for administration to mammals in the treatment of a variety of infections. Essentially any inert pharmaceutical carrier may be used, that is, any substance which is useful for the preparation of dosage forms and which does not tend to inactivate the antibiotic substance. Thus, the novel compounds may be incorporated into capsules with various inert materials or these compounds may be converted into tablets by incorporation with certain tableting agents, such as gums, either natural or synthetic, sweetening agents, coating agents and so forth. Alternatively, the compounds of the present invention may be utilized in the form of injectable preparations. For administration by the intramuscular route, the medium for the active compounds may be water, saline, non-toxic vegetable oils, and other materials of this nature. For administration by the intravenous route, care must be taken to make certain that a clear solution in water, saline, or glucose solution is prepared. It should be noted that, upon prolonged storage in aqueous solution, the antibiotic activity may be lost to an appreciable extent and there may be a tendency for solid materials to separate. Certain other dosage forms, such as ointments or salves, may be prepared with a suitable base, preferably a non-hydrophilic base, such as petroleum jelly and substances of this nature.

The novel 5a,11a-dehydro-6-epitetracyclines of the present invention may be readily prepared from 7-chloro-5a,11a-dehydrotetracycline as follows. The isomerization of 7-chloro-5a,11a-dehydrotetracycline to 7-chloro-5a,11a-dehydro-6-epitetracycline may be accomplished in liquid hydrogen fluoride at temperatures ranging from 0° C. to room temperature over a period of time of from about 10 minutes to about one hour. The addition of 1 or 2 equivalents of water to the reaction mixture considerably improves the yield of the isomerized product. The 7-chloro-5a,11a-dehydro-6-epitetracycline may then be catalytically hydrogenated to the 5a,11a-dehydro-6-epitetracycline at room temperature and atmospheric pressure using 10% palladium-on-charcoal catalyst. The 5a,11a-dehydro-6-epitetracycline may then be brominated in liquid hydrogen fluoride or conc. sulfuric acid using N-bromosuccinimide to yield the 7-bromo-5a,11a-dehydro-6-epitetracycline. The 7-chloro- and 7-bromo-5a,11a-dehydro-6-epitetracyclines may then be nitrated by the addition of potassium nitrate to a hydrofluoric acid or conc. sulfuric acid solution of the compounds at a temperature of 0° C.–25° C. over a period of time of from about 5 minutes to about one hour whereby the 7-chloro-9-nitro-5a,11a-dehydro-6-epitetracycline and 7-bromo-9-nitro-5a,11a-dehydro-6-epitetracycline are obtained. These nitro derivatives may then be reduced to the corresponding 7-chloro-9-amino-5a,11a-dehydro-6-epitetracycline and 7-bromo-9-amino-5a,11a-dehydro-6-epitetracycline by contacting them with a suitable reducing agent such as hydrogen. This is carried out by shaking the reaction mixture in a closed system in the presence of hydrogen gas and a noble metal catalyst at about 1–4 atmospheres of pressure. This reduction may be conveniently carried out at room temperature and over a period of time of from about 30 minutes to about 4–5 hours. Alternatively, reducing agents such as formic acid or metal-acid combinations may be used to carry out this reduction.

The 5a,11a-dehydro-6-epitetracycline may be nitrated by the addition of potassium nitrate to a hydrofluoric acid or conc. sulfuric acid solution of the compound at a temperature of 0° C.–25° C. over a period of time of from about 5 minutes to about one hour whereby the 7-nitro-5a,11a-dehydro-6-epitetracycline, 9-nitro-5a,11a-dehydro-6-epitetracycline and 7,9-dinitro-5a,11a-dehydro-6 - epitetracycline are obtained. These nitration products may be readily separated by procedures well known to those skilled in the art such as recrystallization from various solvents and mixed solvent systems, chromatographic techniques, and counter-current distribution, all of which are usually employed for this purpose. These nitro derivatives may then be reduced to the corresponding 7-amino-5a,11a-dehydro-6-epitetracycline, 9-amino-5a,11a - dehydro-6-epitetracycline, 7-amino-9-nitro-5a,11a-dehydro - 6-epitetracycline, 7-nitro-9-amino-5a,11a-dehydro - 6 - epitetracycline and 7,9-diamino-5a,11a-dehydro-6-epitetracycline by contacting them with a suitable reducing agent such as hydrogen. This is carried out by shaking the reaction mixture in a closed system in the presence of hydrogen gas and a noble metal catalyst at about 1–4 atmospheres of pressure. This reduction may be conveniently carried out at room temperature and over a period of time of from about 30 minutes to about 4–5 hours. Alternatively, reducing agents such as formic acid or metal-acid combinations may be used to carry out this reduction.

The 7- and/or 9-nitro- and/or amino-5a,11a-dehydro-6-epitetracycline derivatives set forth above may be reductively alkylated to the corresponding mono(lower alkyl)amino and/or di(lower alkyl)amino derivatives by contacting them with a carbonyl compound of the general formula:

wherein $R_1$ and $R_2$ are the same or different and are hydrogen or lower alkyl, in the presence of a reducing agent. In this context, suitable lower alkyl groups are those having up to about 5 carbon atoms. Accordingly, aldehydes and ketones useful in carrying out this reductive alkylation include, for example, formaldehyde, acetaldehyde, propionaldehyde, n - butyraldehyde, isobutyraldehyde, acetone, methylethyl ketone, diethyl ketone, etc. The other general conditions of this reductive alkylation such as reducing agents, time, temperature, and the like are conventional and are similar to those set forth in U.S. Patent No. 3,148,212 to Boothe et al. Typical 7- and/or 9-mono(lower alkyl)amino- and/or di(lower alkyl)amino-5a,11a-dehydro-6-epitetracyclines which may be thus prepared are:

7-chloro-9-dimethylamino-5a,11a-dehydro-6-epitetracycline,
7-bromo-9-diethylamino-5a,11a-dehydro-6-epitetracycline,
7-methylamino-5a,11a-dehydro-6-epitetracycline,
7-dimethylamino-5a,11a-dehydro-6-epitetracycline,
7-isopropylamino-5a,11a-dehydro-6-epitetracycline,
7-diethylamino-5a,11a-dehydro-6-epitetracycline,
9-n-butylamino-5a,11a-dehydro-6-epitetracycline, and
7,9-di(methylethylamino)-5a,11a-dehydro-6-epitetracycline.

The invention will be described in greater detail in conjunction with the following specific examples.

EXAMPLE 1

*Preparation of 7-chloro-5a,11a-dehydro-6-epitetracycline*

A solution of 1.026 grams (2 millimoles) of 7-chloro-5a,11a-dehydrotetracycline hydrochloride in 6 milliliters of liquid anhydrous hydrofluoric acid in a polyethylene vessel in an ice bath was stirred as 80γ of water was added. The stirring was continued for 35 minutes after which the solvent was removed in a brisk stream of nitrogen. The residue was triturated with dry diethyl ether until solid, filtered off, washed well with diethyl ether and dried. The dry solid, so obtained, was dissolved in 10 milliliters of water and the neutral form precipitated by adjusting the pH of the solution with 2 N aqueous sodium hydroxide solution to 5.0. The neutral form was collected and dried. The product of two such reactions weighed 1560 milligrams. This material was dissolved in 40 milliliters of the lower phase of a system heptane:ethyl acetate:methyl Cellosolve:water (70:30:15:4) and then mixed with 80 grams of neutral (acid washed) Celite®. This was packed on the top of a 400 gram column of Celite® (mixed with 200 milliliters of the lower phase). The upper phase was placed on the top of the column and about 1300 milliliters was collected before the product came off in a yellow band which was collected in the next 850 milliliters. The solvent was evaporated to give 350 milligrams. The in vitro assay was 1290γ/ml. (TC=1000). The starting material was inactive.

EXAMPLE 2

*Preparation of 5a,11a-dehydro-6-epitetracycline*

A solution of 119 mg. (0.25 mmole) of 7-chloro-5a,11a-dehydro-6-epitetracycline in 5 ml. of dimethylformamide and 35λ of triethylamine was reduced at room temperature and atmospheric pressure using 120 mg. of 10% palladium-on-charcoal catalyst. Reduction was complete in 7 minutes (uptake was 10 ml., theory 10 ml.). The catalyst was filtered off on a Celite® pad and washed with 1 ml. of dimethylformamide. The filtrate was evaporated to dryness in vacuo and the residue solidified by treatment with ethyl acetate and heptane, wt. 123 mg. The solid was dissolved in 12 ml. of the aqueous phase of a system heptane:ethyl acetate:methyl Cellosolve:water (60:40:15:4)

and mixed with 24 g. of Celite®. This was packed on to a column of 120 g. of Celite® (previously mixed with 60 ml. of the same aqueous phase). The product came off in the second hold back volume as the column was developed with upper phase, weight 38 mg.

EXAMPLE 3

*Preparation of 9-nitro-7-chloro-5a,11a-dehydro-6-epitetracycline*

A solution of 260 milligrams of 7-chloro-5a,11a-dehydro-6-epitetracycline hydrochloride in 3.0 milliliters of concentrated sulfuric acid in a polyethylene vessel in an ice bath was stirred as 56 milligrams of powdered potassium nitrate was added. The stirring was continued at ice bath temperatures for 10 minutes and then the solution was poured into rapidly stirred diethyl ether. The solid precipitate was filtered off and dried in vacuo. A crude neutral sample was purified by partition column chromatography on neutral (acid washed) Celite® using the system heptane:ethyl acetate:methyl Cellosolve:water (60:40:15:4)

The product was eluted in the second holdback volume, $R_f=0.96$ [starting material $R_f=0.25$ (system methyl ethyl ketone:water pH 7.7)].

What is claimed is:

1. A compound selected from the group consisting of those of the formula:

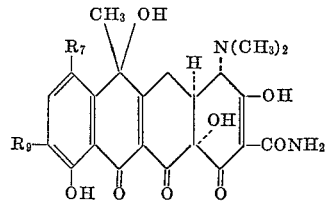

wherein $R_7$ is selected from the group consisting of hydrogen, chloro, bromo, nitro, amino, mono(lower alkyl)amino and di(lower alkyl)amino and $R_9$ is selected from the group consisting of hydrogen, nitro, amino, mono(lower alkyl)amino and di(lower alkyl)amino, and the non-toxic pharmaceutically acceptable cationic and anionic salts thereof.

2. A compound according to claim 1 wherein $R_7$ is hydrogen and $R_9$ is hydrogen.
3. A compound according to claim 1 wherein $R_7$ is chloro and $R_9$ is hydrogen.
4. A compound according to claim 1 wherein $R_7$ is bromo and $R_9$ is hydrogen.
5. A compound according to claim 1 wherein $R_7$ is chloro and $R_9$ is nitro.
6. A compound according to claim 1 wherein $R_7$ is chloro and $R_9$ is amino.
7. A compound according to claim 1 wherein $R_7$ is nitro and $R_9$ is hydrogen.
8. A compound according to claim 1 wherein $R_7$ is hydrogen and $R_9$ is nitro.
9. A compound according to claim 1 wherein $R_7$ is dimethylamino and $R_9$ is hydrogen.
10. A compound according to claim 1 wherein $R_7$ is hydrogen and $R_9$ is dimethylamino.

References Cited

UNITED STATES PATENTS 3,275,513   9/1966   Nash et al.

NICHOLAS S. RIZZO, *Primary Examiner.*

UNITED STATES PATENT OFFICE
CERTIFICATE OF CORRECTION

Patent No. 3,373,198  March 12, 1968

Michael Joseph Martell, Jr., et al.

It is hereby certified that error appears in the above numbered patent requiring correction and that the said Letters Patent should read as corrected below.

Column 2, line 17, "(2) 5a, 11a-dehydro-6-eEitetracycline" should read -- (2) 5a, 11a-dehydro-6-epitetracycline --.
Column 6, lines 31 to 38, the formula should appear as shown below:

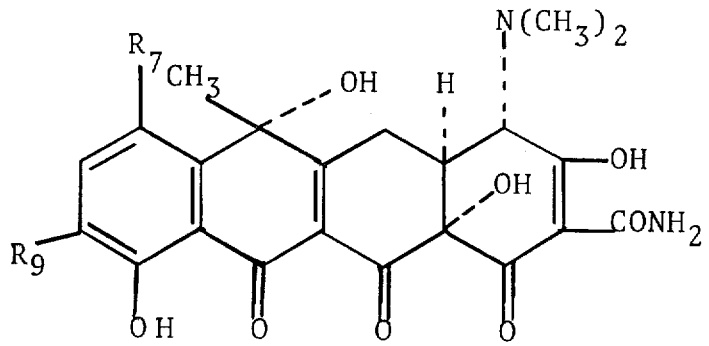

Signed and sealed this 29th day of July 1969.

(SEAL)
Attest:

EDWARD M. FLETCHER, JR.
Attesting Officer

WILLIAM E. SCHUYLER, JR
Commissioner of Patents